(12) United States Patent
Sugimoto et al.

(10) Patent No.: US 7,791,743 B2
(45) Date of Patent: Sep. 7, 2010

(54) IMAGE READER, DISPLAY METHOD AND STORAGE MEDIUM STORING A PROGRAM FOR DISPLAY PROCESSING

(75) Inventors: Hideaki Sugimoto, Saitama (JP); Eiji Shimoichi, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1102 days.

(21) Appl. No.: 11/199,209

(22) Filed: Aug. 9, 2005

(65) Prior Publication Data

US 2006/0215181 A1    Sep. 28, 2006

(30) Foreign Application Priority Data

Mar. 23, 2005    (JP)    ............................. 2005-084174

(51) Int. Cl.
*G06K 15/00*    (2006.01)
(52) U.S. Cl. .................................... 358/1.12
(58) Field of Classification Search ................ 358/1.12
See application file for complete search history.

(56) References Cited

U.S. PATENT DOCUMENTS

| 5,028,042 | A | * | 7/1991 | Yamada et al. | ............. | 271/9.06 |
| 5,706,411 | A | * | 1/1998 | McCormick et al. | ....... | 358/1.14 |
| 5,796,877 | A | * | 8/1998 | Gusmano | ..................... | 382/298 |
| 6,144,468 | A | * | 11/2000 | Watanabe | .................... | 358/496 |
| 6,702,488 | B1 | * | 3/2004 | Hooper et al. | ................ | 400/61 |
| 6,717,693 | B2 | * | 4/2004 | Mitsuhashi et al. | ........ | 358/1.15 |
| 6,765,691 | B2 | * | 7/2004 | Kubo et al. | ................... | 358/1.9 |
| 2004/0057744 | A1 | * | 3/2004 | Kawagoe | ..................... | 399/82 |

FOREIGN PATENT DOCUMENTS

| JP | A-09-185472 | 7/1997 |
| JP | A-2000-278467 | 10/2000 |
| JP | A-2001-150769 | 6/2001 |
| JP | A-2003-145896 | 5/2003 |
| JP | A-2003-158600 | 5/2003 |
| JP | A-2003-177907 | 6/2003 |

OTHER PUBLICATIONS

Japanese Patent Office, *Japanese Office Action* (with English translation), Dec. 15, 2009, pp. 1-2 (p. 1 for translation); Japan.

* cited by examiner

*Primary Examiner*—Benny Q Tieu
*Assistant Examiner*—Jeremiah A Bryar
(74) *Attorney, Agent, or Firm*—Oliff & Berridge, PLC

(57) ABSTRACT

An image reader, which is connected to a printer to issue a print instruction to the printer by directly transmitting image data read by the image reader to the printer, comprises a paper feed direction information acquisition unit that acquires paper feed direction information from the printer according to the print instruction; a paper information acquisition unit that acquires paper information containing size and orientation of paper from the printer according to the print instruction; and a display that displays paper state information containing an orientation of paper consistent with the direction in which the paper is discharged by the printer based on the paper feed direction information and the paper information.

5 Claims, 8 Drawing Sheets

IMAGE READER, DISPLAY METHOD AND STORAGE MEDIUM STORING A PROGRAM FOR DISPLAY PROCESSING

BACKGROUND OF THE INVENTION

1. Field of the Invention

The present invention relates to an image reader, a display method, and a storage medium storing a program for display processing. In particular, the present invention relates to an image reader, a display method, and a storage medium storing a program for display processing, which are designed to provide an output image that is matched with the paper output condition of a printer.

2. Description of the Related Art

In general, paper for use in a printer is stored in paper trays installed in the printer, or in a detachable manual paper feed tray. Paper in these trays is fed by a paper feed roller so that printing is performed on the paper. The paper to be fed is stored in plural separate trays that are classified by paper size or paper quality. A relatively sophisticated printer for business use typically has plural trays installed therein so that plural sizes or plural types of paper can be selectively fed.

Paper stored in a tray may be fed in different directions depending on the shape or structure of a printer. For example, in some printers, paper is fed from either the left or the right side as viewed from the front of the printer (facing the printer), while, in some other printers, paper is fed from the front or the back of the printer.

Further, paper is discharged in different directions depending on the shape or structure of a printer. For example, in some printers, paper is discharged in the forward direction relative to the direction in which paper is fed (introduced) during printing, while in some other printers, paper is discharged in the opposite direction thereto.

Conventionally, if an operator wants to check an event which has occurred in a printer in relation to the feeding or discharging of paper by using a host computer serving as a superordinate apparatus of the printer, he/she will only be able to obtain limited information such as the state of paper feeding and discharging, or the condition of discharged paper.

This poses a problem of failing to provide sufficient usability to users when they directly operate a printer to handle the event relating to the paper feeding and discharging.

Japanese Patent Application Publication No. 09-185472, for example, discloses a technique for enabling a host computer such as a print server to select and display the setting status of printing paper.

According to the conventional technique disclosed in the patent document above, the host computer acquires and stores information for each tray of a printer connected thereto, and transmits such information to a client in response to a tray information display request from the client. Thus, a user is allowed to obtain, on the client side which issues a print instruction, tray information indicating the tray number, size or quality of paper in the tray and the like, without going to the printer server.

Commonly known paper information relating to paper feeding and discharging includes information indicating the orientation of paper after printing, such as SEF (Short Edge Feed) and LEF (Long Edge Feed). SEF means that paper is discharged with the short edge as the leading edge, while LEF means that paper is discharged with the long edge as the leading edge.

According to the conventional technique described in the patent document above, although the operator is allowed to obtain printer tray information without taking the trouble to go to the printer server which is designed to set the tray information. However, the setting of the tray information by the printer server is performed with the use of a predefined tray information setting screen. Accordingly, this conventional technique fails to provide an effective setting method suitable for the use environment of the printers.

In addition, the commonly known information relating to paper feeding and discharging such as SEF or LEF will only allow the user to know which is the leading edge of the paper discharged from the printer's discharging slot, the short edge or the long edge. It is impossible for the user to know from the host computer or print server as the superordinate apparatus of the printer whether the paper is discharged depthwise or crosswise as viewed from the front of the printer. Therefore, the displayed discharging condition is sometimes different from the condition in which the paper is actually discharged. This poses inconvenience to users of the printer.

SUMMARY OF THE INVENTION

The present invention has been made in view of the above circumstances and provides an image reader, a display method and a storage medium storing a program for display processing which are designed to enhance the convenience for users by providing setting environments more suitable for arrangement and configuration of printers.

According to an aspect of the present invention, an image reader which is connected to a printer via a communication system to issue a print instruction to the printer by directly transmitting image data read by the image reader to the printer, comprises a paper feed direction information acquisition unit that acquires, from the printer via the communication system, paper feed direction information indicating whether the feeding direction of paper, which has been printed according to the print instruction, is depthwise or crosswise; a paper information acquisition unit that acquires, from the printer via the communication system, paper information containing size and orientation of paper used for printing according to the print instruction; and a display that displays paper state information containing an orientation of paper consistent with the direction in which the paper is discharged by the printer, based on the paper feed direction information acquired by the paper feed direction information acquisition unit and the paper information acquired by the paper information acquisition unit.

With the above configuration, information indicating a paper feed direction and information indicating an orientation of discharged paper (SEF or LEF) are obtained from a printer. Thus, the paper orientation information displayed on a host computer can be rendered consistent with the paper orientation information displayed on the printer. As a result, the convenience and usability of the printers can be improved.

BRIEF DESCRIPTION OF THE DRAWINGS

Embodiment of the present invention will be described in detail based on the following figures, wherein.

DETAILED DESCRIPTION OF THE EMBODIMENT

A detailed description will now be made of embodiment of an image reader, a display method and a storage medium storing a program for display processing according to the present invention, with reference to the attached drawings.

The following description of the embodiment will be made by taking a scanner as an example of the image reader according to the present invention. However, the present invention is not limited to a scanner, but is also applicable to a superordinate apparatus such as a print server which is capable of displaying information from the printer to users.

Figure 1:
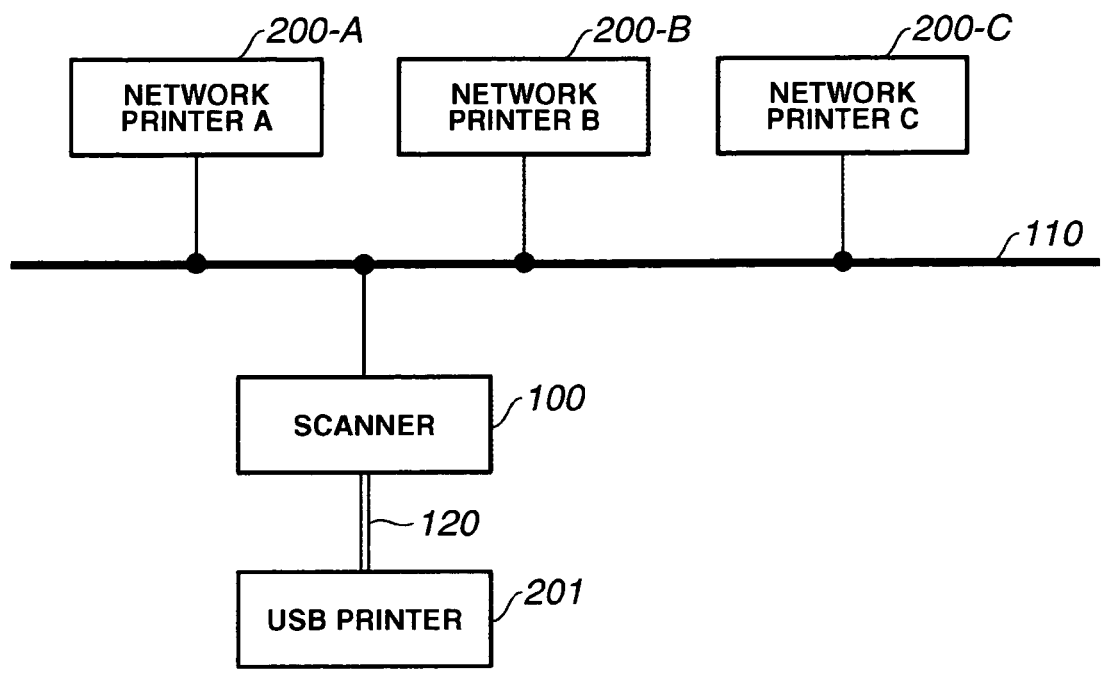
FIG. 1 is a block diagram of a system to which an image reader, a display method and a storage medium storing a program for display processing according to the present invention are applied.

FIG. 1 is a block diagram of a system to which the image reader, the display method and the storage medium storing a program for display processing according to the present invention are applied.

As shown in FIG. 1, the system includes a scanner 100, network printers (200-A, 20 200-B and 200-C) (hereafter, to be referred to as the "network printers 200"), a USB printer 201.

The scanner 100 has plural communication interfaces including a Centronics interface, USB (Universal Serial Bus) interface, and a network interface. The scanner is connected to the network printers 200 via an Ethernet (registered trademark) cable 110, while connected to the USB printer 201 via a USB cable 120.

The network printers 200 and the USB printer 201 communicate with the scanner to perform printing upon receiving a print request from the scanner. Each printer has plural paper tray installed therein, so that the paper trays can be loaded with different sizes of paper. Moreover, these paper trays can be arranged either depthwise or crosswise as required.

Paper orientation information and paper size information are held as tray information for each tray, based on the arrangement of paper. The paper orientation information indicates an orientation of paper discharged from the paper tray by either "SEF" or "LEF". The paper size information indicates a size of paper loaded in the tray If the paper orientation information is "SEF", paper is discharged with its short edge as the leading edge. If the paper orientation information is "LEF", paper is discharged with its long edge as the leading edge.

Further, paper feed direction information indicating a direction paper is fed to the paper discharging tray is also held. The paper feed direction information indicates a direction in which paper is fed as viewed from the front of the printer. For example, if paper is fed to either the left or the right side as viewed from the front of the printer, the paper feed direction information is "crosswise feed". If paper is fed to either the front or the back side, the paper feed direction information is "depthwise feed".

The scanner 100 is capable of performing reading processing of a printing document, and communicates with the printers connected thereto. The scanner 100 is particularly capable of obtaining set information and connection environment information which have been set in the printers.

The set information contains tray information for each tray and paper feed direction information relating to a direction in which paper is discharged into a paper discharging tray The tray information includes the above-mentioned paper orientation information and paper size information.

Based on these tray information and paper feed direction information, the orientation of paper discharged by the printer is determined and displayed to the operator.

In this manner, the orientation of the paper discharged by the printer can be displayed on a display screen of the scanner.

Figure 2:
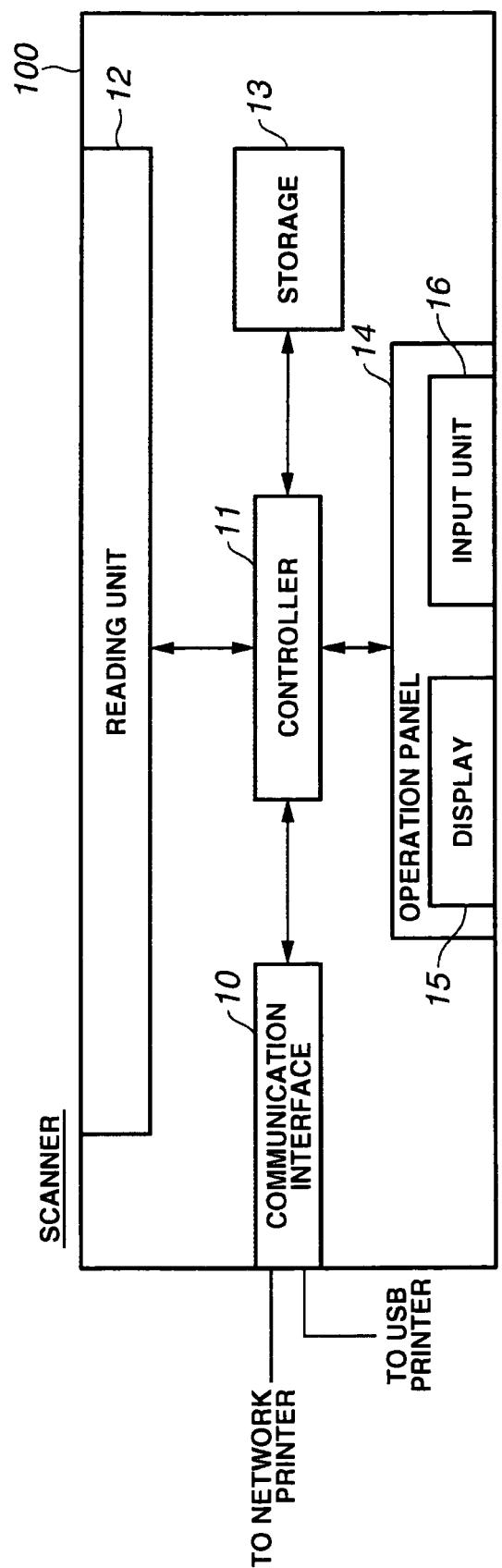
FIG. 2 is a block diagram showing detailed configuration of a scanner.

FIG. 2 is a block diagram showing detailed configuration of the scanner.

As shown in FIG. 2, the scanner 100 includes a communication interface 10, a controller 11, a reading unit 12, a storage 13, an operation panel 14, a display 15, and an input unit 16.

The communication interface 10 is capable of communicating with the printers by means of plural communication systems. For example, the communication interface 10 may be network connected with the use of an Ethernet (registered trademark) cable and P2P connected with the use of a USB cable.

The controller 11 is for main control of the scanner, and controls component parts of the scanner. In order to display an output image of the printer on the display 15 of the operation panel 14, the controller 11 issues an acquisition request to acquire the paper feed direction information and the tray information including the paper orientation information and paper size information from the printer connected via the communication interface 10. The acquired tray information and the paper feed direction information are used to determine the orientation of paper discharged by the printer. This determination is made according to a scanner UI display rule table shown in FIG. 7.

For example, if the paper orientation information acquired as the tray information is "SEF", the paper size information is "A4", and the paper feed direction information is "depthwise feed", it is determined that the orientation of the paper discharged by the printer is "A4 portrait". If the paper orientation information is "LEF", the paper size information is "A4", and the paper feed direction information is "depthwise feed", it is determined that the orientation of the paper discharged by the printer is "A4 landscape".

Further, if the paper orientation information acquired as the tray information is "SEF", the paper size information is "A4", and the paper feed direction information is "crosswise feed", it is determined that the orientation of the paper discharged by the printer is "A4 landscape". If the paper orientation information acquired as the tray information is "LEF", the paper size information is "A4", and the paper feed direction information is "crosswise feed", it is determined that the orientation of the paper discharged by the printer is "A4 portrait".

The paper orientation thus determined is transferred to and displayed on the display 15 of the operation panel 14.

The controller 11 also performs read control of the reading unit 12 reading a printing document.

The acquired tray information and paper feed direction information may be stored and managed for each of the printers.

The reading unit 12 is subjected to the read control by the controller 11 and reads the printing document upon receiving a read instruction therefrom.

The storage 13 is formed by a ROM (Read Only Memory) or RAM (Random Access Memory), and stores programs required for the scanner to perform read control and other operations as well as various parameters used in the programs. The storage 13 further stores image data read by the reading unit 12.

The operation panel 14 has the display 15 and the input unit 16, and functions as a user interface to give an operation instruction to the scanner.

When the paper orientation in the printer is determined by the controller 11, the display 15 displays the paper orientation according to the determination. Examples of such display are shown in FIGS. 8A to 8D.

The input unit 16 is a four-way scroll key or a button, which is used to set read conditions or give a read instruction to the scanner.

The configuration as described above enables the scanner to acquire, when connected to a printer, the tray information including orientation information and size information of paper in the tray and the paper feed direction information from the connected printer, and to display on the scanner an output image of the paper according to the scanner UI display rule table.

Figure 3A:
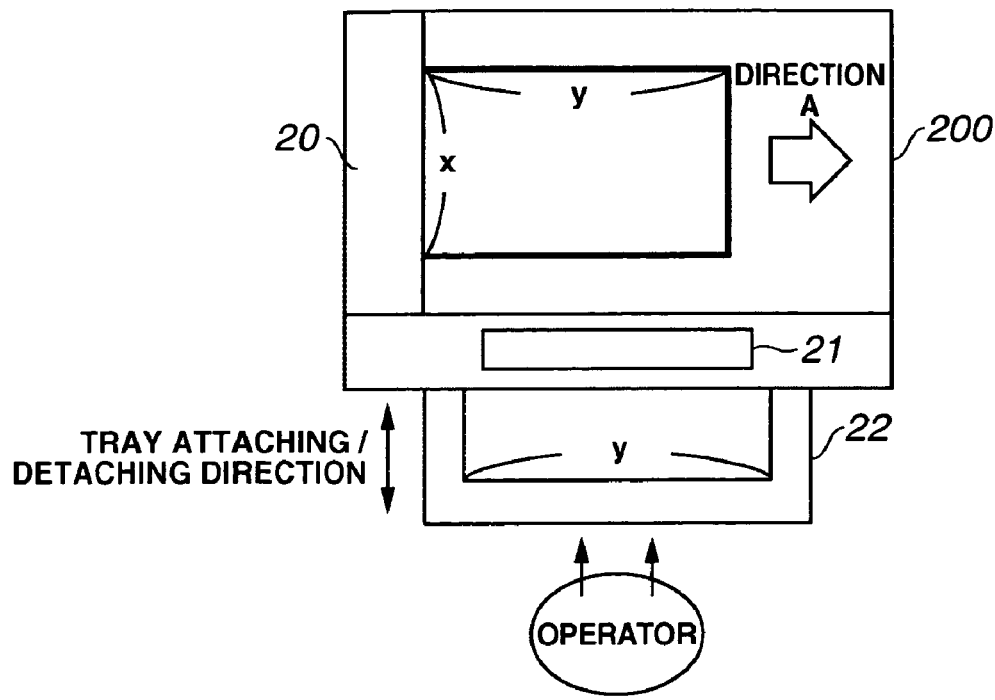
FIGS. 3A and 3B are top views illustrating a printer and an operator directly facing the printer.
Figure 3B:
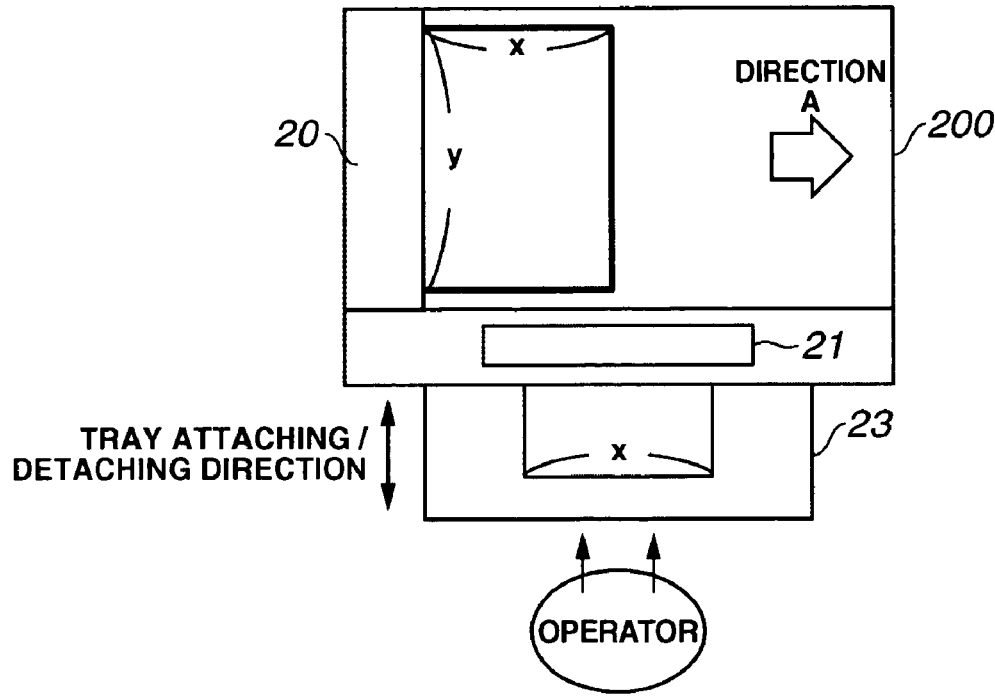

FIGS. 3A and 3B are top views showing a printer and an operator directly facing the printer.

FIGS. 3A and 3B both show a same printer having plural paper trays, and respectively show different examples in which paper is fed from different trays.

The printer in FIG. 3A includes a paper conveyor 20, a display 21, and a paper tray 22. When A4 size paper is loaded in the paper tray 22 with the long edge horizontal and the short edge vertical, the paper orientation information of the tray information possessed by the printer is "SEF", and the paper size information is "A4".

The printer in FIG. 3B includes the paper conveyor 20, the display 21, and a paper tray 23. When A4 size paper is loaded in the paper tray 23 with the short edge horizontal and the long edge vertical, the paper orientation information of the tray information possessed by the printer is "LEF", and the paper size information is "A4".

The paper orientation information of the tray information indicates the orientation of paper discharged from the tray. If the paper orientation information is "SEF", it means that the paper is discharged with the short edge as the leading edge. If the paper orientation information is "LEF", it means that the paper is discharged with the long edge as the leading edge.

Such paper orientation information is equivalent to the orientation information of paper discharged to the paper discharging tray. Therefore, the condition of paper (landscape or portrait) discharged to the paper discharging tray can be determined by fixing the physical paper feed direction as viewed from the front side, that is, the side where the operation panel and so on are provided (with the operator directly facing the printer). The paper feed direction may be either previously held by each printer, or set by a user using the operation panel or the like according to an installation condition of the printers.

For example, in the example shown in FIG. 3A, the paper feed direction of the printer is fixed to the crosswise direction, or the direction A shown in the drawing, as viewed from the front of the printer. Therefore, it can be determined from the paper orientation information that the paper will be discharged with the long edge horizontal and the short edge vertical. The display 21 of the printer displays the discharging state as "A4 landscape".

In the example shown in FIG. 3B as well, the paper feed direction of the printer is fixed to the crosswise direction, or the direction A shown in the drawing, as viewed from the front of the printer. Therefore, it can be determined from the paper orientation information that the paper will be discharged with the long edge vertical and the short edge horizontal. The display 21 of the printer displays the discharging state as "A4portrait".

Figure 8A:
FIGS. 8A to 8D show examples of a screen displayed on the scanner display.
Figure 8B:

In the case of FIG. 3A, the scanner is notified of the paper feed direction information of "crosswise feed" and the paper orientation information of "SEF". In the case of FIG. 3B, the scanner is notified of the paper feed direction information of "crosswise feed" and the paper orientation information of "LEF". The scanner is further notified of the paper size information indicating the size of paper to be discharged. In both the cases of FIGS. 3A and 3B, the scanner is notified of the paper size information of "A4". FIG. 8A shows an example of the display of the scanner in the case of FIG. 3A, while FIG. 8B shows an example of the display of the scanner in the case of FIG. 3B.

Figure 4A:
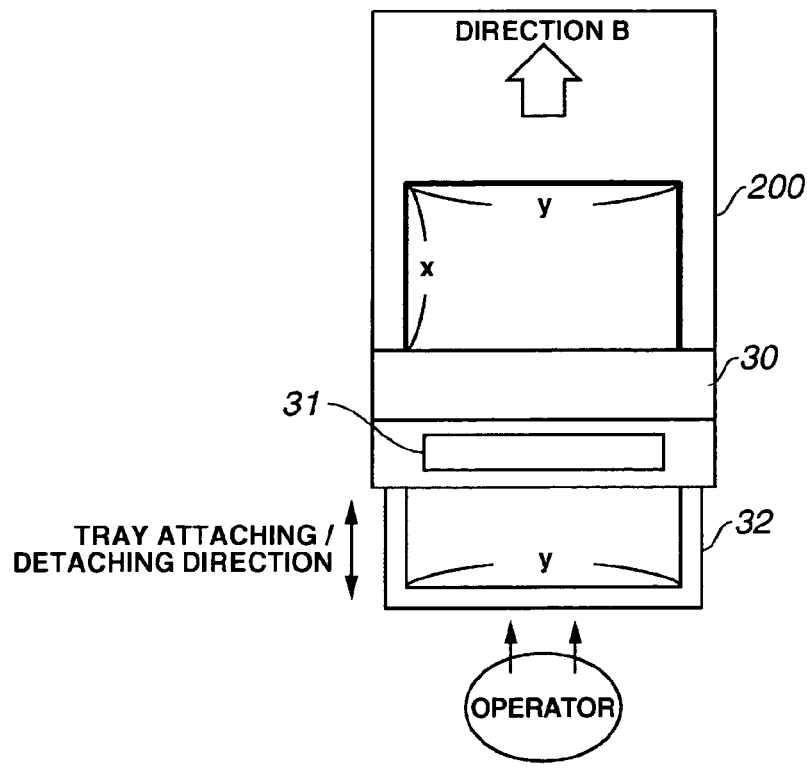
FIGS. 4A and 4B are top views illustrating a printer and an operator directly facing the printer.
Figure 4B:
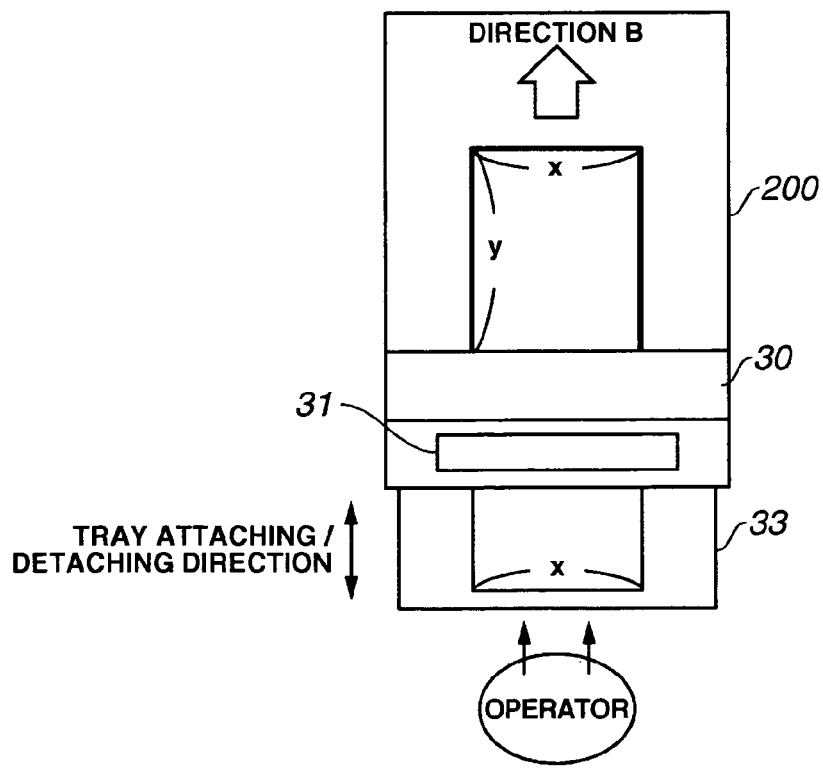

FIGS. 4A and 4B are other top views showing a printer and an operator facing the printer.

FIGS. 4A and 4B both show a same printer having plural paper trays, and show different examples in which paper is fed from different trays.

The printer in FIG. 4A includes a paper conveyor 30, a display 31, and a paper tray 32. When A4 size paper is loaded in the paper tray 32 with the long edge horizontal and the short edge vertical, the paper orientation information of the tray information possessed by the printer is "LEF" and the paper size information is "A4".

The printer in FIG. 4B includes the paper conveyor 30, the display 31, and a paper tray 33. When A4 size paper is loaded in the paper tray 33, the paper orientation information of the tray information possessed by the printer is "SEF", and the paper size information is "A4".

As mentioned in relation to FIGS. 3A and 3B, the paper feed direction may be either previously held by the printer, or set by the user. In the examples shown in FIGS. 4A and 4B, the paper feed direction is set to "the depthwise direction from the front to the back".

For example, in the example shown in FIG. 4A, the paper feed direction is "the depthwise direction", or the direction B shown in the drawing, and the paper orientation information is "LEF". Therefore, the paper is discharged with the long side horizontal and the short side vertical, and the display 31 of the printer in FIG. 4A displays the message of "A4 landscape".

In the example shown in FIG. 4B, the paper feed direction is "the depthwise direction, or the direction B shown in the drawing, and the paper orientation information is "SEF". Therefore, the paper is discharged with the long edge vertical and the sort edge horizontal, and the display 31 of the printer in FIG. 4 displays the message of "A4 portrait".

Figure 8C:
Figure 8D:

In the case of FIG. 4A, the scanner is notified of the paper feed direction information of "depthwise feed" and the paper orientation information of "LEF". In the case of FIG. 4B, the scanner is notified of the paper feed direction information of "depthwise feed" and the paper orientation information of "SEF". The scanner is further notified of the paper size information indicating the size of paper to be discharged. In both the cases of FIGS. 4A and 4B, the scanner is notified of the paper size information of "A4". FIG. 8C shows an example of the display of the scanner in the case of FIG. 4A, while FIG. 8D shows an example of the display of the scanner in the case of FIG. 4B.

Figure 5:
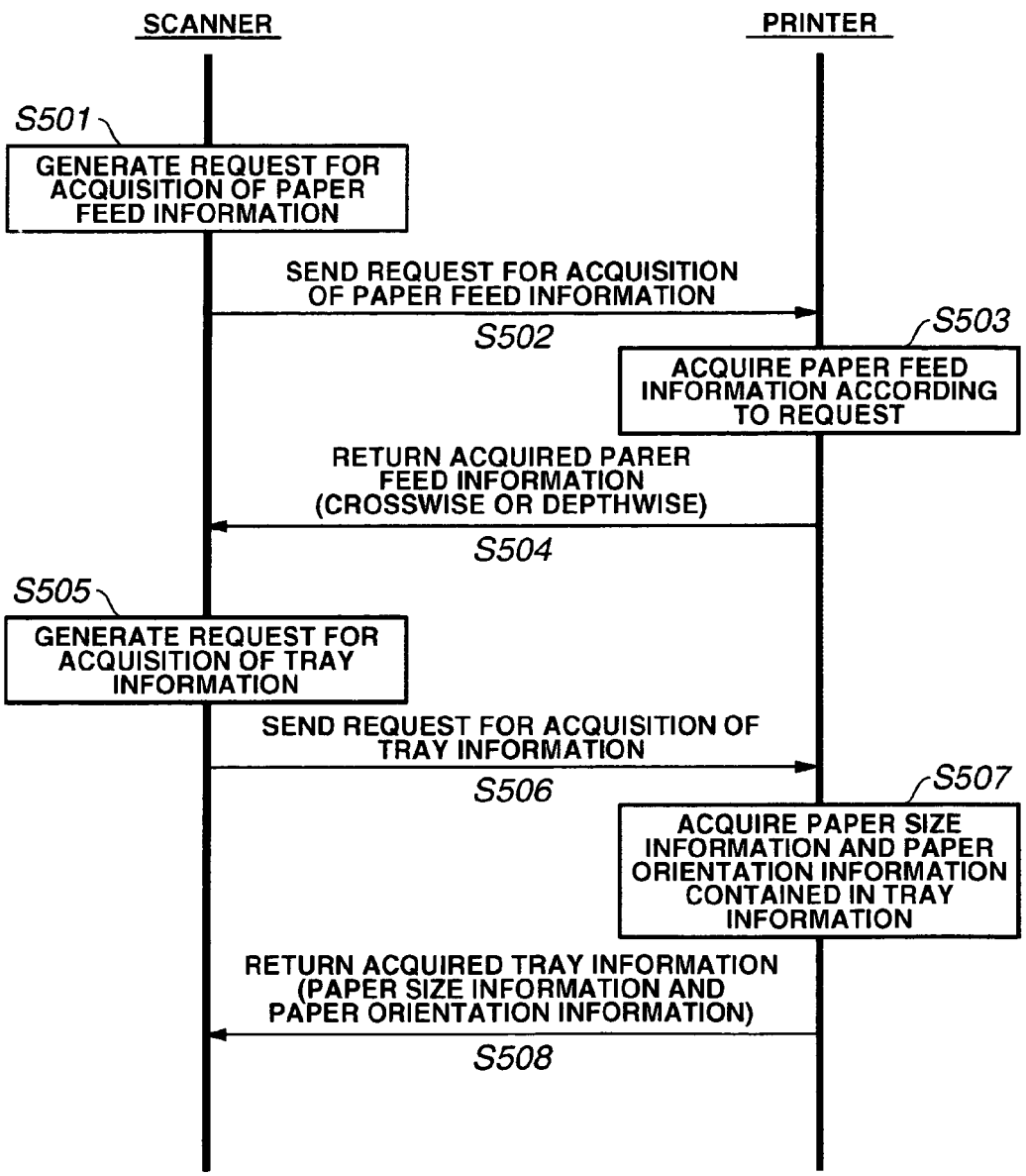
FIG. 5 is a sequence diagram showing a sequence of processing performed between a scanner and a printer until acquisition of paper information.

FIG. 5 is a sequence diagram showing a sequence of processing performed between the scanner and the printer until acquisition of the paper information.

As shown in FIG. 5, the processing starts when the scanner is connected to the printer or the scanner is powered on. An acquisition request is generated to request acquisition of paper feed information indicating a paper feed direction as view from the front of the printer (S501), and the acquisition request is provided to the printer (S502). Upon receiving the acquisition request for the paper feed information, the printer acquires the paper feed direction information (S503), and returns the paper feed direction information as a response to the acquisition request (S504). The paper feed direction information indicates the paper feed direction as viewed from the front of the printer, and is either "depthwise feed" or "crosswise feed".

Subsequently, an acquisition request is generated to request acquisition of paper size information and paper orientation information contained in tray information of the tray attached to the printer (S505), and the acquisition request is provided to the printer (S506). Upon receiving the acquisition request, the printer acquires the tray information and extracts the paper size information and the paper orientation information therefrom (S507). The printer returns the paper size information and the paper orientation information to the scanner as a response to the acquisition request (S508). This sequence of processing from the generation of the acquisition request for the tray information (S505) to the response to the acquisition request (S508) is repeated for a number of times corresponding to the number of trays installed in the printer.

The sequence of processing described above enables the scanner to acquire the paper feed direction information of the printer and the paper size information and paper orientation information for each of the trays installed in the printer.

Figure 6:
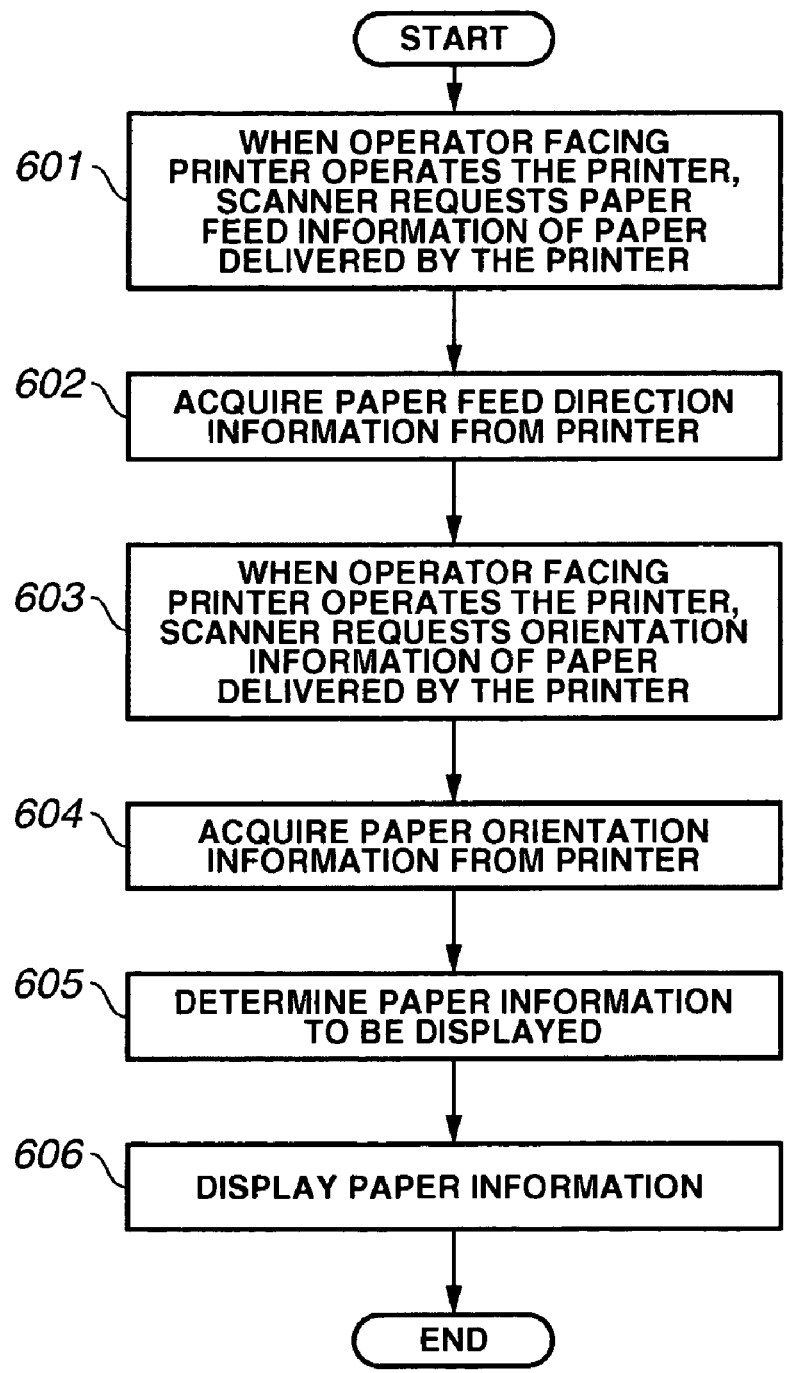
FIG. 6 is a flowchart showing processing for displaying paper information of the printer on the scanner.

FIG. 6 is a flowchart showing the processing to display paper information of the printer on the scanner.

As shown in FIG. 6, the processing is started upon connection between the scanner and the printer. The scanner requests to the printer paper feed direction information which indicates the direction paper is fed as viewed from the operator who directly faces the front side of the printer where the operation panel including a display is provided (S601). The scanner then acquires the paper feed direction information from the printer (S602). The scanner further issues an acquisition request for paper size information and paper orientation information for each of the trays attached to the printer (S603), and acquires from the printer the paper size information and the paper orientation information for each of the trays (S604).

Figure 7:
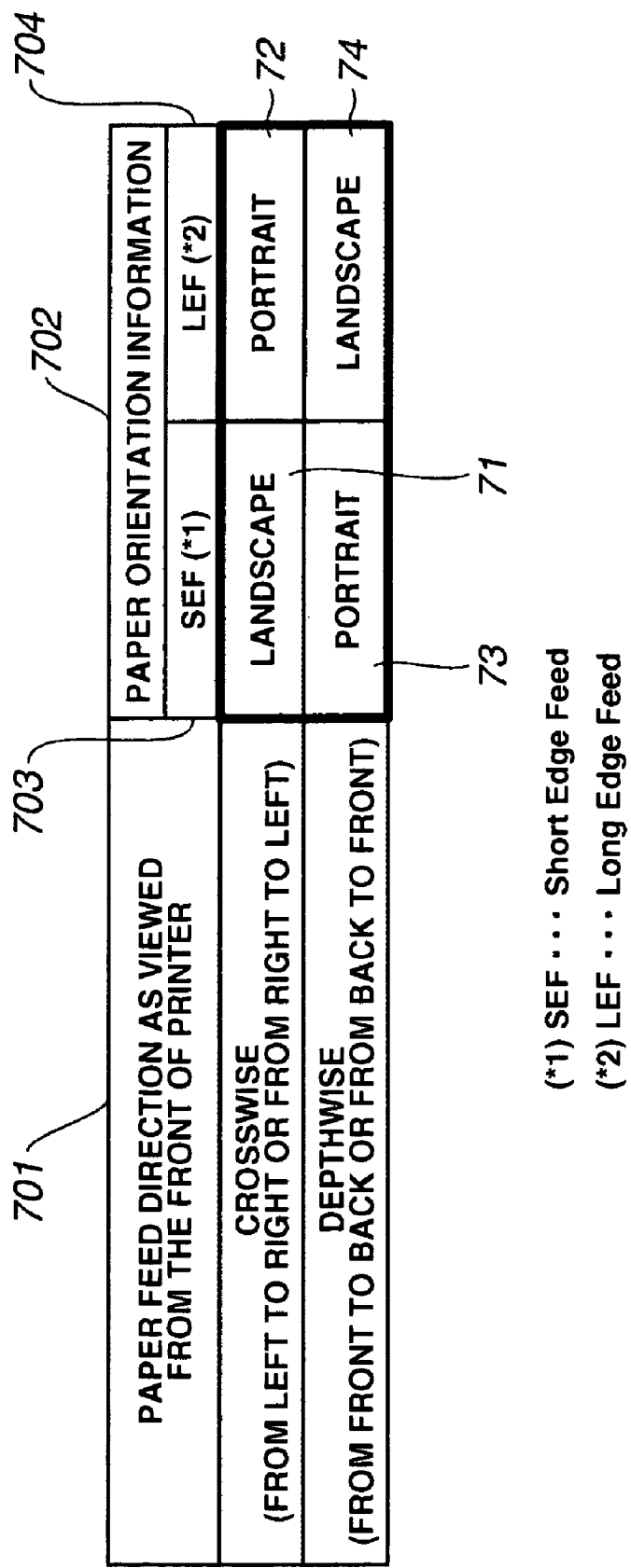
FIG. 7 shows a scanner UI display rule table defining paper information to be displayed on the scanner display.

Based on the paper feed direction information of the printer and the paper size information and the paper orientation information for each of the trays installed in the printer thus acquired, paper information to be displayed is determined with reference to the scanner UI display rule table as shown in FIG. 7 (S605).

The paper information of the printer thus determines is displayed on the display of the scanner operation panel (S606).

The scanner is thus enabled to display the output image consistent with the actual paper discharging state in the printer.

FIG. 7 shows the scanner UI display rule table defining paper information to be displayed on the scanner display.

The scanner UI display rule table in FIG. 7 includes an item 701 of paper feed direction as viewed from the front of the printer, and an item 702 of paper orientation information received from the printer. Further, an item 703 is provided for the case when the paper orientation information is "SEF", and an item 704 for the case when "LEF".

For example, when the paper feed direction information is "crosswise feed" and the paper orientation information 702 is "SEF", the paper information indicating the orientation of discharged paper is shown as "landscape" 71 in the item 703, while when the paper orientation information 702 is "LEF", the paper information indicating the orientation of discharged paper is shown as "portrait" 72 in the item 704.

When the paper feed direction information is "depthwise feed" and the paper orientation information 702 is "SEF", the paper information indicating the orientation of discharged paper is shown as "portrait" 73 in the item 703, while when the paper orientation information 702 "LEF", the paper information indicating the orientation of discharged paper is shown as "landscape" 73 in the item 704.

The scanner display is thus able to display the orientation of discharged paper in consistency with the paper discharging state in the printer, based on the paper feed direction information and the paper orientation information of the printer.

FIGS. 8A to 8D show examples of a screen displayed on the scanner display.

FIG. 8A shows an example of a screen indicating the orientation of the discharged paper based on the paper feed direction information and the paper orientation information received from the printer as shown in FIG. 3A. FIG. 8B shows an example of a screen indicating the orientation of the discharged paper based on the paper feed direction information and the paper orientation information received from the printer as shown in FIG. 3B. FIG. 8C shows an example of a screen indicating the orientation of the discharged paper based on the paper feed direction information and the paper orientation information received from the printer as shown in FIG. 4A. FIG. 8D shows an example of a screen indicating the orientation of the discharged paper based on the paper feed direction information and the paper orientation information received from the printer as shown in FIG. 4B.

A paper size is also displayed together with the paper orientation.

The scanner is thus enabled to correctly recognize the orientation of paper discharged by the printer, and to display the output image consistent with the orientation of the paper actually discharged in the printer.

The configuration as described above makes it possible to ensure consistency between the orientation of paper actually discharged and the paper orientation displayed on the scanner.

Accordingly, according to the present invention, the output image can be displayed in consistency with the actual discharging state of the paper, and hence the usability for the users can be improved.

The processing in the flowchart in FIG. 6 may also be realized by an image forming program executable by a computer.

It should be understood that the present invention is not limited to the specific embodiments as described above and shown in the attached drawings, and changes and variations may be made without departing from the spirit or scope of the invention.

The present invention is applicable to a superordinate apparatus which displays paper information relating to the feeding and discharging in a printer. The present invention is particularly effectively applicable to a use environment where plural printers are connected, to display a screen indicating the state of paper based on paper information of each of the printers.

As described above, according to an aspect of the present invention, an image reader, which is connected to a printer via a communication system to issue a print instruction to the printer by directly transmitting image data read by the image reader to the printer, comprises a paper feed direction information acquisition unit that acquires, from the printer via the communication system, paper feed direction information indicating whether the feeding direction of paper, which has been printed according to the print instruction, is depthwise or crosswise; a paper information acquisition unit that acquires, from the printer via the communication system, paper information containing size and orientation of paper used for printing according to the print instruction; and a display that displays paper state information containing an orientation of paper consistent with the direction in which the paper is discharged by the printer, based on the paper feed direction information acquired by the paper feed direction information acquisition unit and the paper information acquired by the paper information acquisition unit.

According to another aspect of the present invention, in the image reader according to the first-mentioned aspect of the present invention, the paper feed direction information acquisition unit acquires the paper feed direction information from the printer at least once while the image reader is connected to the printer.

According to still another aspect of the present invention, in the image reader according to the first-mentioned aspect of the present invention, the paper information acquisition unit acquires the paper information from the printer every time paper is reloaded in the paper tray of the printer.

According to further aspect of the present invention, a display method for an image reader which is connected to a printer via a communication system to issue a print instruction to the printer by directly transmitting image data read by the image reader to the printer, comprises acquiring, by a paper feed direction information acquisition unit from the printer via the communication system, paper feed direction information indicating whether the direction of feeding paper, which has been printed according to the print instruction, is depthwise or crosswise; acquiring, by a paper information acquisition unit from the printer via the communication system, paper information containing size and orientation of paper used for printing according to the print instruction; and displaying, on a display, paper state information containing an orientation of paper consistent with the direction in which the paper is discharged by the printer, based on the paper feed direction information acquired by the paper feed direction information acquisition unit and the paper information acquired by the paper information acquisition unit.

According to even another aspect of the present invention, a storage medium readable by a computer, stores a program of instructions executable by the computer to perform a function for display processing in an image reader which is connected to a printer via a communication system to issue a print instruction to the printer by directly transmitting image data read by the image reader to the printer, the program comprising acquiring, from the printer via the communication system, paper feed direction information indicating whether direction of feeding paper, which has been printed according to the print instruction, is depthwise or crosswise; acquiring, from the printer via the communication system, paper information containing size and orientation of paper used for printing according to the print instruction; and displaying, on a display, paper state information containing orientation of paper consistent with direction in which the paper is discharged by the printer, based on the paper feed direction information acquired by the paper feed direction information acquisition unit and the paper information acquired by the paper information acquisition unit.

The forgoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-84174 filed on Mar. 23, 2005 including specification, claims, drawings and abstract is incorporated herein by reference in its entirety.

What is claimed is:

1. An image reader which is connected to a printer via a communication line to issue a print instruction to the printer by directly transmitting image data read by the image reader to the printer, the image reader comprising:

a paper feed direction information acquisition unit that acquires, from the printer, paper feed direction information indicating whether the feeding direction of paper, which has been printed in the printer, is depthwise or crosswise;

a paper information acquisition unit that acquires, from the printer, paper information indicating whether an orientation of paper to be fed from a paper tray of the printer according to the print instruction is a short edge feed (SEF) or a long edge feed (LEF), the SEF meaning that a long edge of the paper is horizontal and a short edge of the paper is vertical, the LEF meaning that the short edge of the paper is horizontal and the long edge of the paper is vertical;

a printed paper information determining unit that (1) determines that an orientation of paper which has been printed is indicated as landscape in a printed paper information when the paper feed direction information acquired by the paper feed direction information acquisition unit indicates crosswise and the orientation of paper indicated in the paper information acquired by the paper information acquisition unit is the SEF or when the paper feed direction information acquired by the paper feed direction information acquisition unit indicates depthwise and the orientation of paper indicated in the paper information acquired by the paper information acquisition unit is the LEF or (2) determines that the orientation of paper which has been printed is indicated as portrait in the printed paper information when the paper feed direction information acquired by the paper feed direction information acquisition unit indicates crosswise and the orientation of paper indicated in the paper information acquired by the paper information acquisition unit is the LEF or when the paper feed direction information indicates depthwise and the orientation of paper indicated in the paper informality is the SEF; and a display that displays the orientation of paper indicated in the printed paper information determined by the printed paper information determining unit as an orientation of paper having been printed and to be discharged from the printer.

2. The image reader according to claim 1, wherein the paper feed direction information acquisition unit acquires the paper feed direction information from the printer at least once while the image reader is connected to the printer.

3. The image reader according to claim 1, wherein the paper information acquisition unit acquires the paper information from the printer every time paper is reloaded in the paper tray of the printer.

4. A display method for an image reader which is connected to a printer via a communication line to issue a print instruction to the printer by directly transmitting image data read by the image reader to the printer, the display method comprising:

acquiring, from the printer, paper feed direction information indicating whether the direction of feeding paper, which has been printed in the printer, is depthwise or crosswise;

acquiring, from the printer, paper information indicating whether an orientation of paper to be fed from a paper tray of the printer according to the print instruction is a short edge feed (SEF) or a long edge feed (LEF), the SEF meaning that a long edge of the paper is horizontal and a short edge of the paper is vertical, the LEF meaning that the short edge of the paper is horizontal and the long edge of the paper is vertical;

determining (1) that an orientation of paper which has been printed is landscape when the paper feed direction information acquired by the printer is crosswise and the orientation of paper indicated in the paper information is the SEF or when the paper feed direction information is depthwise and the orientation of paper indicated in the paper information is the LEF, and (2) that the orientation of paper which has been printed is portrait when the paper feed direction information is crosswise and the orientation of paper indicated in the paper information is the LEF or when the paper feed direction information is depthwise and the orientation of paper indicated in the paper information is the SEF; and displaying the orientation thus determined and size of the paper to having been printed and to be discharged from the printer.

5. A storage medium readable by a computer, the storage medium storing a program of instructions executable by the computer to perform a function for displaying an orientation of paper having printed and discharged from an image reader which is connected to a printer via a communication line to issue a print instruction to the printer by directly transmitting image data read by the image reader to the printer, the program comprising:

acquiring, from the printer, paper feed direction information indicating whether direction of feeding paper, which has been printed in the printer, is depthwise or crosswise;

acquiring, from the printer, paper information indicating whether orientation of paper to be fed from a paper tray of the printer according to the print instruction is a short edge feed (SEF) or a long edge feed (LEF), the SEF meaning that a long edge of the paper is horizontal and a short edge of the paper is vertical, the LEF meaning that the short edge of the paper is horizontal and the long edge of the paper is vertical;

determining (1) that an orientation of paper which has been printed is landscape when the paper feed direction information acquired by the printer is crosswise and the orientation of paper indicated in the paper information is the SEF or when the paper feed direction information is depthwise and the orientation of paper indicated in the paper information is the LEF, and (2) that the orientation of paper which has been printed is portrait when the paper feed direction information is crosswise and the orientation of paper indicated in the paper information is the LEF or when the paper feed direction information is depthwise and the orientation of paper indicated in the paper information is the SEF; and displaying the orientation thus determined and size of the paper having been printed and to be discharged from the printer.

\* \* \* \* \*